(12) United States Patent
Kondo et al.

(10) Patent No.: US 9,513,467 B2
(45) Date of Patent: Dec. 6, 2016

(54) IMAGING LENS AND IMAGING APPARATUS EQUIPPED WITH THE IMAGING LENS

(71) Applicant: FUJIFILM Corporation, Tokyo (JP)

(72) Inventors: Masato Kondo, Saitama (JP); Takayuki Noda, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 24 days.

(21) Appl. No.: 14/745,474

(22) Filed: Jun. 22, 2015

(65) Prior Publication Data

US 2015/0286036 A1   Oct. 8, 2015

Related U.S. Application Data

(63) Continuation of application No. PCT/JP2013/007225, filed on Dec. 9, 2013.

(60) Provisional application No. 61/755,239, filed on Jan. 22, 2013.

(30) Foreign Application Priority Data

Dec. 25, 2012   (JP) ................. 2012-281683

(51) Int. Cl.
| | | |
|---|---|---|
| G02B 3/02 | (2006.01) | |
| G02B 13/00 | (2006.01) | |
| G02B 13/18 | (2006.01) | |
| G02B 9/60 | (2006.01) | |

(52) U.S. Cl.
CPC ............ *G02B 13/0045* (2013.01); *G02B 9/60* (2013.01); *G02B 13/18* (2013.01)

(58) Field of Classification Search
CPC ............ G02B 13/18; G02B 3/04; G02B 9/60
USPC .................................. 359/708, 714
See application file for complete search history.

(56) References Cited

U.S. PATENT DOCUMENTS

| | | |
|---|---|---|
| 8,000,031 B1 | 8/2011 | Tsai |
| 8,179,615 B1 | 5/2012 | Tang et al. |
| 2012/0087019 A1 | 4/2012 | Tang et al. |
| 2012/0087020 A1 | 4/2012 | Tang et al. |
| 2012/0092778 A1 | 4/2012 | Tsai et al. |
| 2012/0188656 A1 | 7/2012 | Chen |
| 2013/0003195 A1 | 1/2013 | Kubota et al. |

(Continued)

FOREIGN PATENT DOCUMENTS

| | | |
|---|---|---|
| CN | 202583582 | 12/2012 |
| JP | 2011-085733 | 4/2011 |
| JP | 2013-011710 | 1/2013 |

(Continued)

*Primary Examiner* — James Greece
(74) *Attorney, Agent, or Firm* — Jianq Chyun IP Office

(57) ABSTRACT

An imaging lens consists of five lenses, including: a fist lens having a biconvex shape with the surface having the radius of curvature with the smaller absolute value toward the object side, a second lens having a negative refractive power and a concave surface toward the image side, a third lens having a meniscus shape with a convex surface toward the object side, a fourth lens having a negative refractive power and a meniscus shape with a convex surface toward the image side, and a fifth lens having a negative refractive power and a meniscus shape with a concave surface toward the image side, the image-side surface thereof having at least one inflection point, disposed in this order from the object side.

17 Claims, 10 Drawing Sheets

(56) References Cited

U.S. PATENT DOCUMENTS

2013/0057973 A1 3/2013 Kubota et al.
2013/0182336 A1* 7/2013 Hsu et al. .................. 359/714
2014/0126073 A1 5/2014 Tsai et al.

FOREIGN PATENT DOCUMENTS

| JP | 2013-054099 | 3/2013 |
| KR | 2012-0018573 | 3/2012 |
| TW | 201310059 | 3/2013 |

\* cited by examiner

IMAGING LENS AND IMAGING APPARATUS EQUIPPED WITH THE IMAGING LENS

CROSS-REFERENCE TO RELATED APPLICATIONS

This application is a Continuation of PCT International Application No. PCT/JP2013/007225 filed on Dec. 9, 2013, which claims priority under 35 U.S.C §119(a) to Japanese Patent Application No. 2012-281683 filed on Dec. 25, 2012 and U.S. Provisional Patent Application No. 61/755,239 filed on Jan. 22, 2013. Each of the above application(s) is hereby expressly incorporated by reference, in its entirety, into the present application.

BACKGROUND OF THE DISCLOSURE

Field of the Disclosure

The disclosure is related to a fixed focus imaging lens for forming optical images of subjects onto an image sensor such as a CCD (Charge Coupled Device) and a CMOS (Complementary Metal Oxide Semiconductor). The disclosure is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Description of the Related Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Image sensors such as CCD's and CMOS's are employed in these devices having photography functions. Recently, miniaturization of these image sensors is advancing, and there is demand for miniaturization of the entirety of the photography devices as well as imaging lenses to be mounted thereon. At the same time, the number of pixels in image sensors is increasing, and there is demand for high resolution and high performance of imaging lenses. Performance corresponding to 5 megapixels or greater, and more preferably 8 megapixels or greater, is desired.

In response to such demands, imaging lenses having a five or six lens configuration, which is a comparatively large number of lenses, may be considered. For example, Patent Documents 1 and 2 (U.S. Pat. No. 8,000,031 and U.S. Unexamined Patent Application Publication No. 20120087019) propose an imaging lens with a five-lens configuration, including a first lens having a positive refractive power, a second lens having a negative refractive power, a third lens having a positive refractive power, a fourth lens having a negative refractive power, and a fifth lens having a negative refractive power, disposed in this order from the object side.

SUMMARY OF THE DISCLOSURE

Meanwhile, there is demand for imaging lenses for use in apparatuses which are becoming thinner such as cellular telephones, smart phones, and tablet terminals to have shortened total lengths. Accordingly, there is demand for the imaging lenses disclosed in Patent Documents 1 and 2 listed above to have an even shorter total length.

The disclosure has been developed in view of the foregoing points. The disclosure provides an imaging lens that can achieve shortening the total length while being capable of realizing high imaging performance from a central angle of view to peripheral angles of view. The disclosure provides an imaging apparatus equipped with the lens, which is capable of obtaining high resolution photographed images.

An imaging lens of the disclosure consisting of five lenses, including:

a first lens having a biconvex shape with a surface having the radius of curvature with the smaller absolute value toward the object side;

a second lens having a negative refractive power with a concave surface toward the image side;

a third lens having a meniscus shape with a convex surface toward the object side;

a fourth lens having a negative refractive power and a meniscus shape with a convex surface toward the image side; and a fifth lens having a negative refractive power and a meniscus shape with a concave surface toward the image side, the image-side surface thereof having at least one inflection point, disposed in this order from the object side.

According to the imaging lens of the disclosure, the configuration of each lens element of the first lens through the fifth lens is optimized within a lens configuration having five lenses as a whole. Therefore, a lens system that can achieve a shortened total length while having high imaging performance can be realized.

Note that in the imaging lens of the disclosure, the expression "consisting of five lenses" means that the imaging lens of the disclosure may also include lenses that practically have no power, optical elements other than lenses such as a stop and a cover glass, and mechanical components such as lens flanges, a lens barrel, a camera shake correcting mechanism, etc., in addition to the five lenses. In addition, the shapes of the surfaces and the signs of the refractive powers of the above lenses will be considered in the paraxial region for those that include aspherical surfaces.

The optical performance of the imaging lens of the disclosure can be further improved by adopting the following favorable configurations.

It is preferable for the imaging lens of the disclosure to satisfy any one of conditional formulae (1) through (9) below. Note that as a preferable aspect of the disclosure, the imaging lens of the disclosure may satisfy any one or arbitrary combination of conditional formulae (1) through (9).

$$-0.6 < f/f45 < -0.1 \tag{1}$$

$$-0.42 < f/f45 < -0.23 \tag{1-1}$$

$$0.5 < f \tan \omega / R5r < 10 \tag{2}$$

$$1.5 < f \tan \omega / R5r < 4.5 \tag{2-1}$$

$$1 < f3/f1 < 10 \tag{3}$$

$$2.5 < f3/f1 < 8 \tag{3-1}$$

$$-1 < (R3f - R3r)/(R3f + R3r) < 0 \tag{4}$$

$$-0.8 < (R3f - R3r)/(R3f + R3r) < -0.2 \tag{4-1}$$

$$-1 < (R2r - R3f)/(R2r + R3f) < 0 \tag{5}$$

$$-0.3 < (R2r - R3f)/(R2r + R30 < -0.05 \tag{5-1}$$

$$0.8 < f/f1 < 1.5 \quad (6)$$

$$0.9 < f/f1 < 1.4 \quad (6\text{-}1)$$

$$0.1 < f/f3 < 0.6 \quad (7)$$

$$0.15 < f/f3 < 0.4 \quad (7\text{-}1)$$

$$-1 < f/f2 < -0.2 \quad (8)$$

$$-0.8 < f/f2 < -0.5 \quad (8\text{-}1)$$

$$0.05 < D7/f < 0.2 \quad (9)$$

where,
f45: the combined focal length of the fourth lens and the fifth lens,
f: the focal length of the entire system,
ω: a half angle of view,
R5r: the paraxial radius of curvature of the image-side surface of the fifth lens,
f3: the focal length of the third lens,
f1: the focal length of the first lens,
R3f: the paraxial radius of curvature of the object-side surface of the third lens,
R3r: the paraxial radius of curvature of the image-side surface of the third lens,
R2r: the paraxial radius of curvature of the image-side surface of the second lens,
f2: the focal length of the second lens, and
D7: the distance between the third lens and the fourth lens along the optical axis.

An imaging apparatus according to the disclosure is equipped with the imaging lens of the disclosure.

The imaging apparatus according to the disclosure is capable of obtaining high-resolution imaging signals based on optical images formed by the imaging lens of the disclosure.

According to the imaging lens of the disclosure, the configuration of each lens element is optimized within a lens configuration having five lenses as a whole, and the shape of particularly the third lens is favorably configured. Therefore, a lens system that can achieve shortening the total length while having high imaging performance from a central angle of view to peripheral angles of view can be realized.

Further, the imaging apparatus of the disclosure outputs imaging signals corresponding to optical images formed by the imaging lens of the disclosure having high imaging performance. Therefore, the imaging apparatus of the disclosure is capable of obtaining high resolution photographed images.

Figure 6:
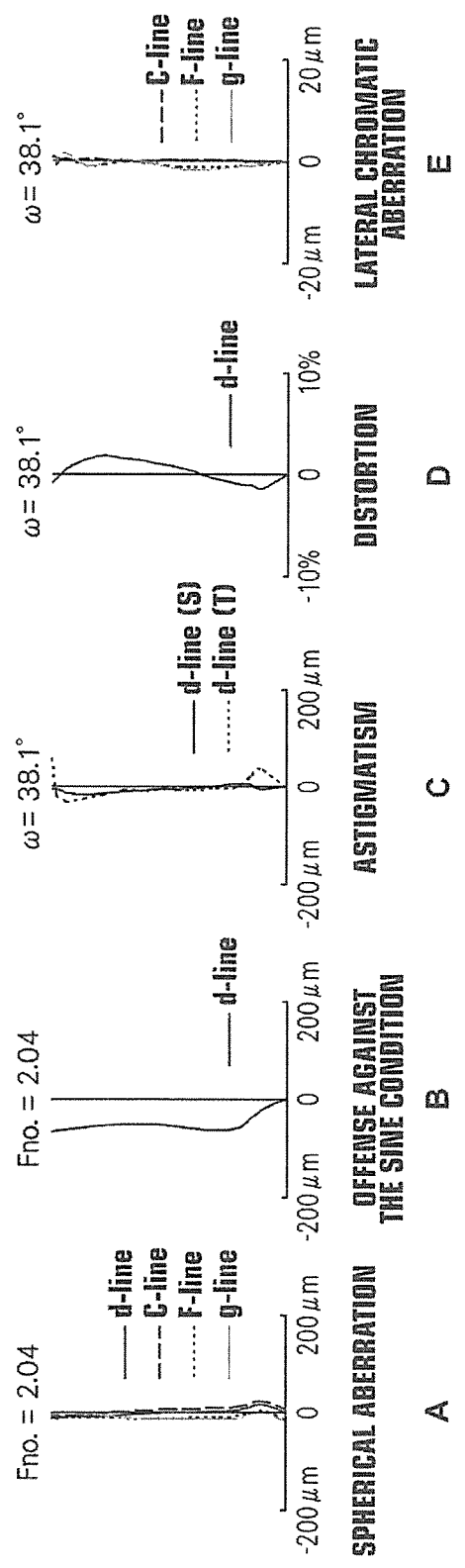

A through E of FIG. 6 are diagrams that illustrate various aberrations of the imaging lens according to Example 1 of the disclosure, wherein A illustrate spherical aberration, B illustrates offense against the sine condition, C illustrates astigmatism (field curvature), D illustrates distortion, and E illustrates lateral chromatic aberration.

Figure 7:
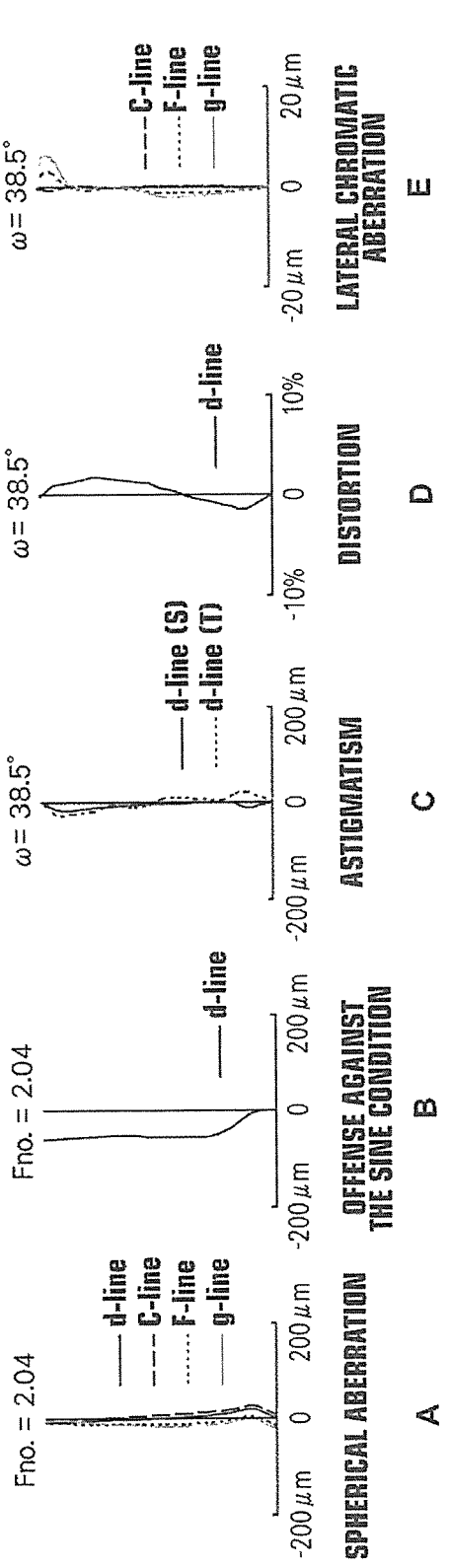

A through E of FIG. 7 are diagrams that illustrate various aberrations of the imaging lens according to Example 2 of the disclosure, wherein A illustrate spherical aberration, B illustrates offense against the sine condition, C illustrates astigmatism (field curvature), D illustrates distortion, and E illustrates lateral chromatic aberration.

Figure 8:
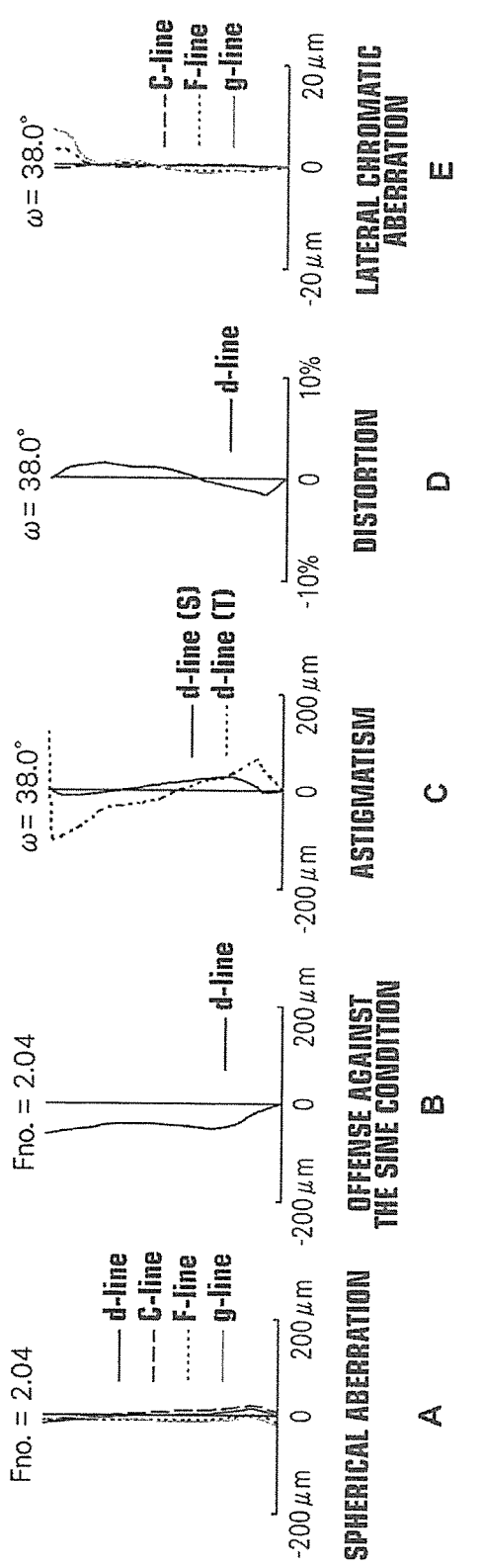

A through E of FIG. 8 are diagrams that illustrate various aberrations of the imaging lens according to Example 3 of the disclosure, wherein A illustrate spherical aberration, B illustrates offense against the sine condition, C illustrates astigmatism (field curvature), D illustrates distortion, and E illustrates lateral chromatic aberration.

Figure 9:
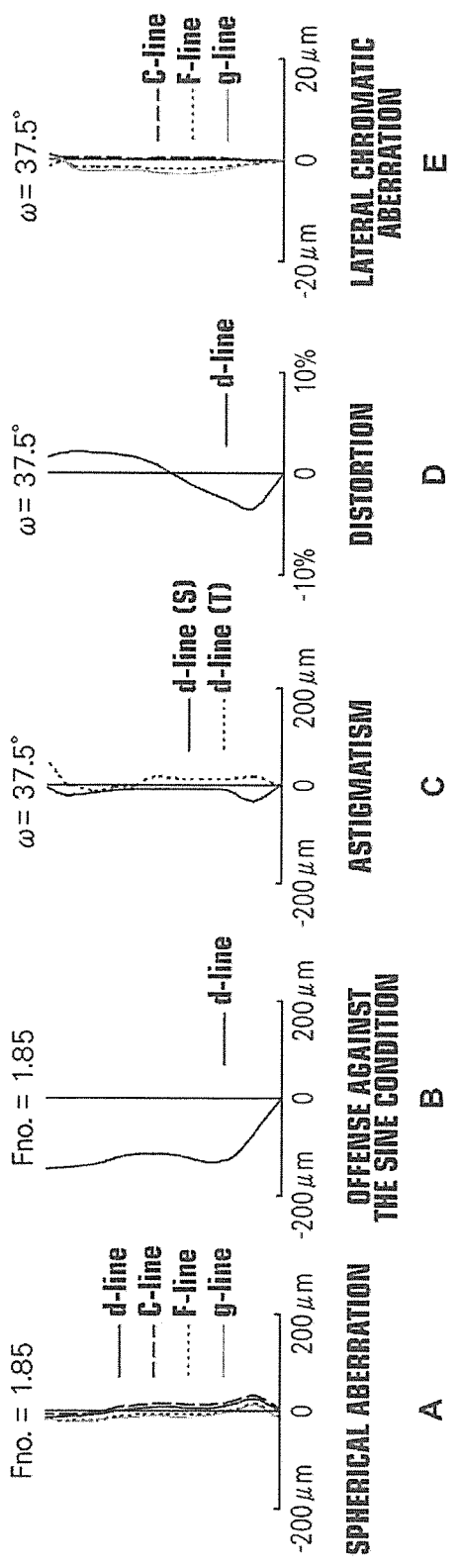

A through E of FIG. 9 are diagrams that illustrate various aberrations of the imaging lens according to Example 4 of the disclosure, wherein A illustrate spherical aberration, B illustrates offense against the sine condition, C illustrates astigmatism (field curvature), D illustrates distortion, and E illustrates lateral chromatic aberration.

Figure 10:
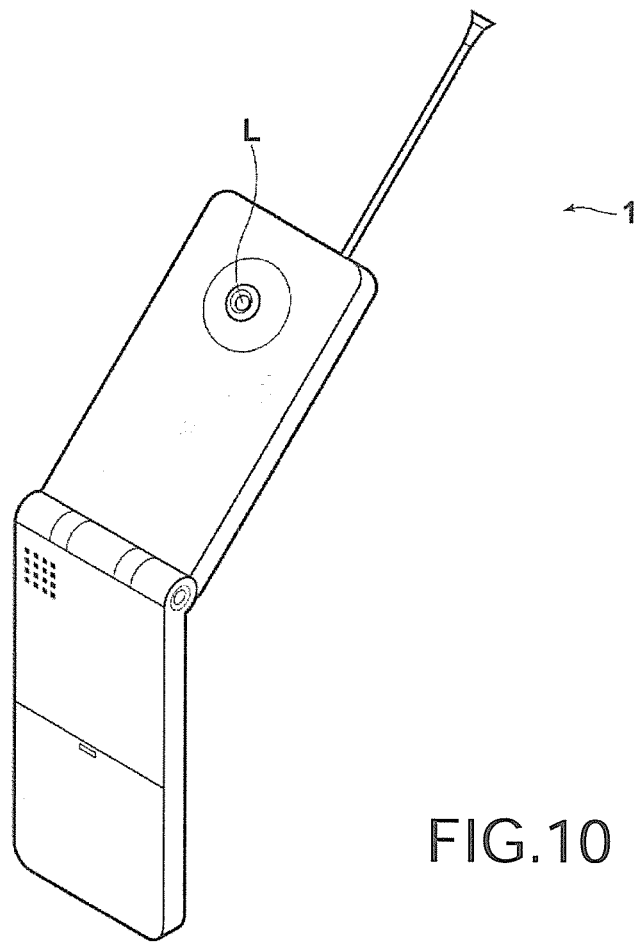

FIG. 10 is a diagram that illustrates a cellular telephone as an imaging apparatus equipped with the imaging lens of the disclosure.

Figure 11:
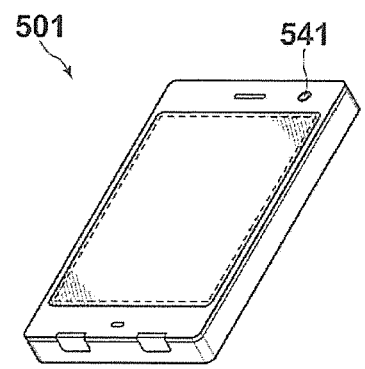

FIG. 11 is a diagram that illustrates a smart phone as an imaging apparatus equipped with the imaging lens of the disclosure.

DESCRIPTION OF THE PREFERRED EMBODIMENTS

Hereinafter, embodiments of the disclosure will be described in detail with reference to the attached drawings.

Figure 1:
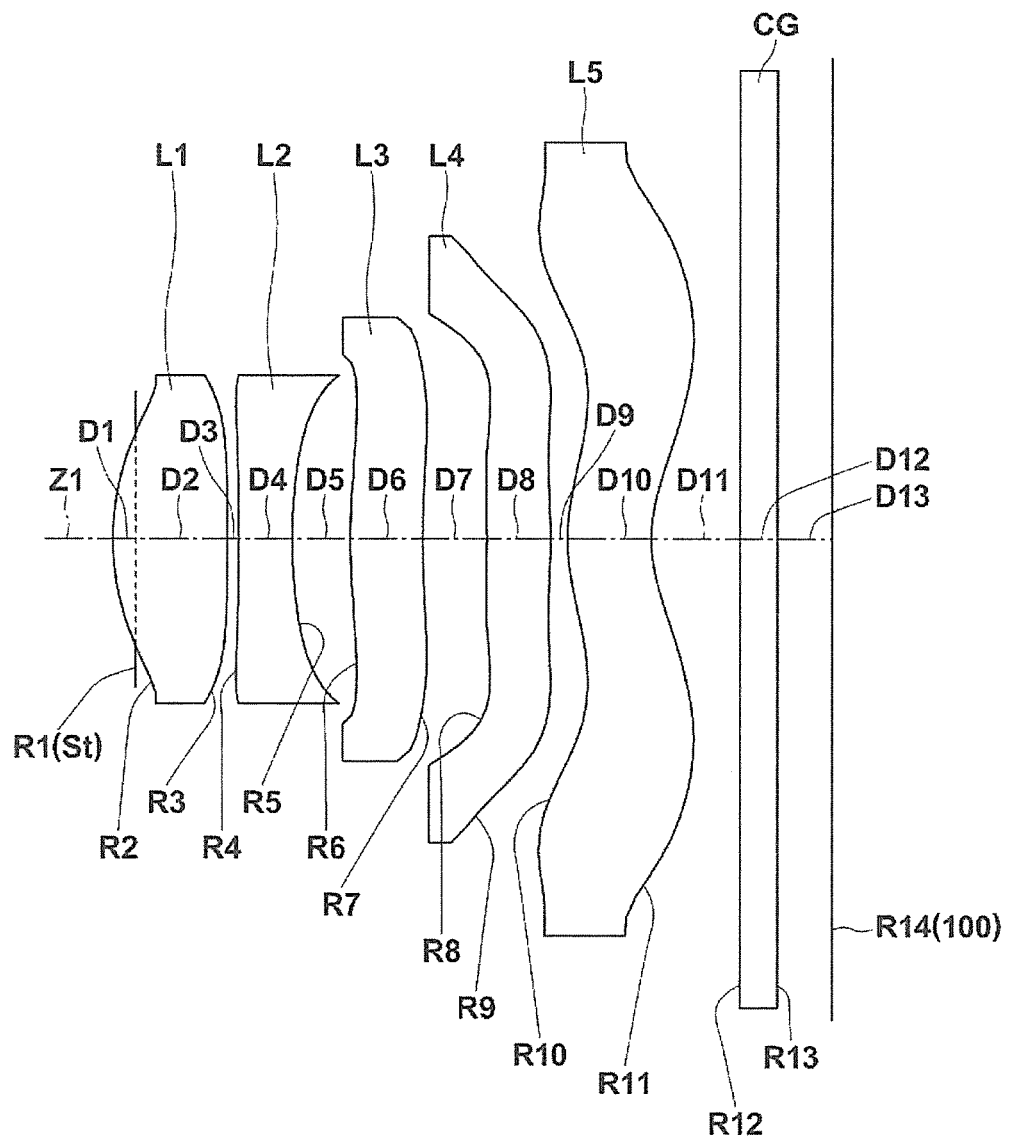
FIG. 1 is a sectional diagram that illustrates a first example of the configuration of an imaging lens according to an embodiment of the disclosure, and corresponds to a lens of Example 1.
Figure 2:
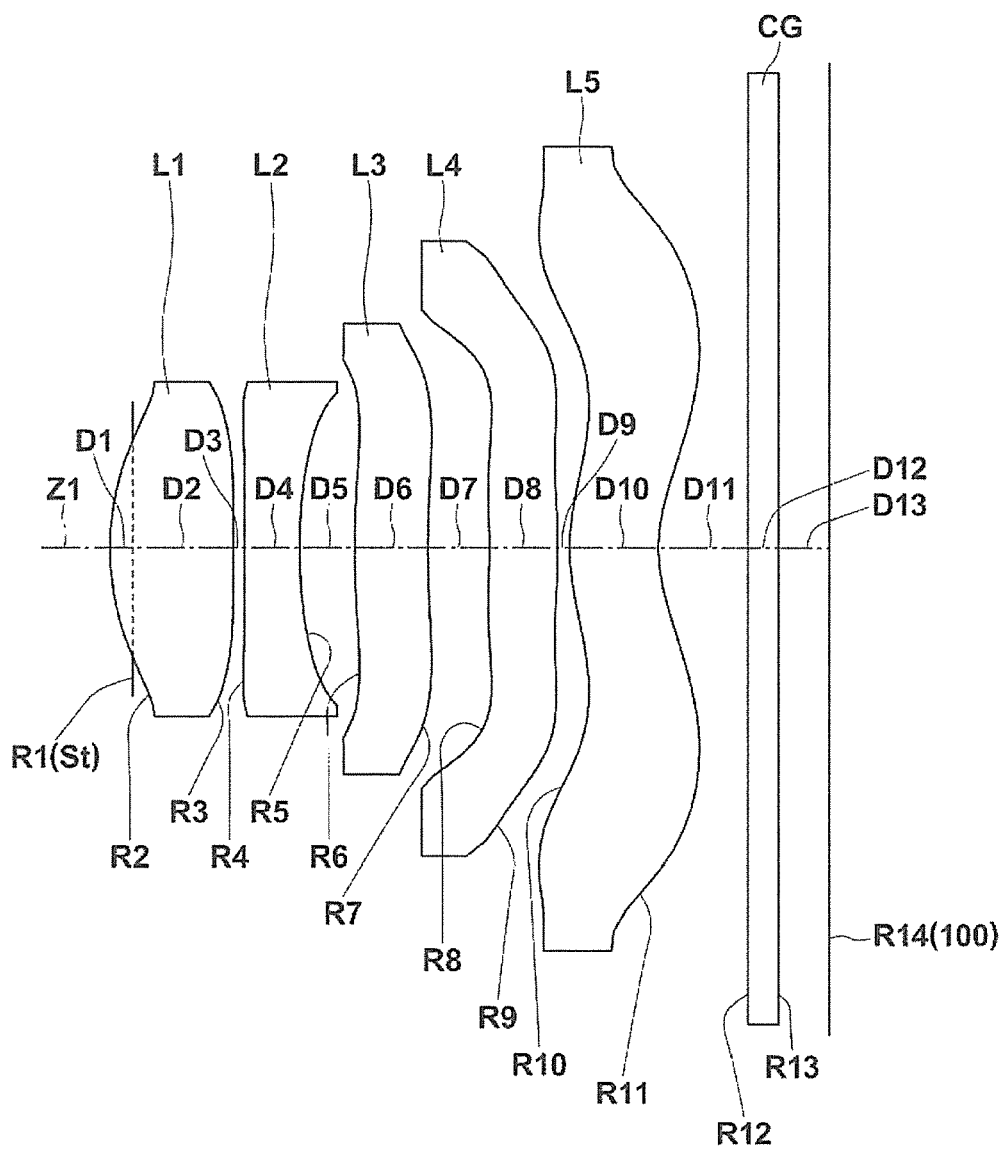
FIG. 2 is a sectional diagram that illustrates a second example of the configuration of an imaging lens according to an embodiment of the disclosure, and corresponds to a lens of Example 2.
Figure 3:
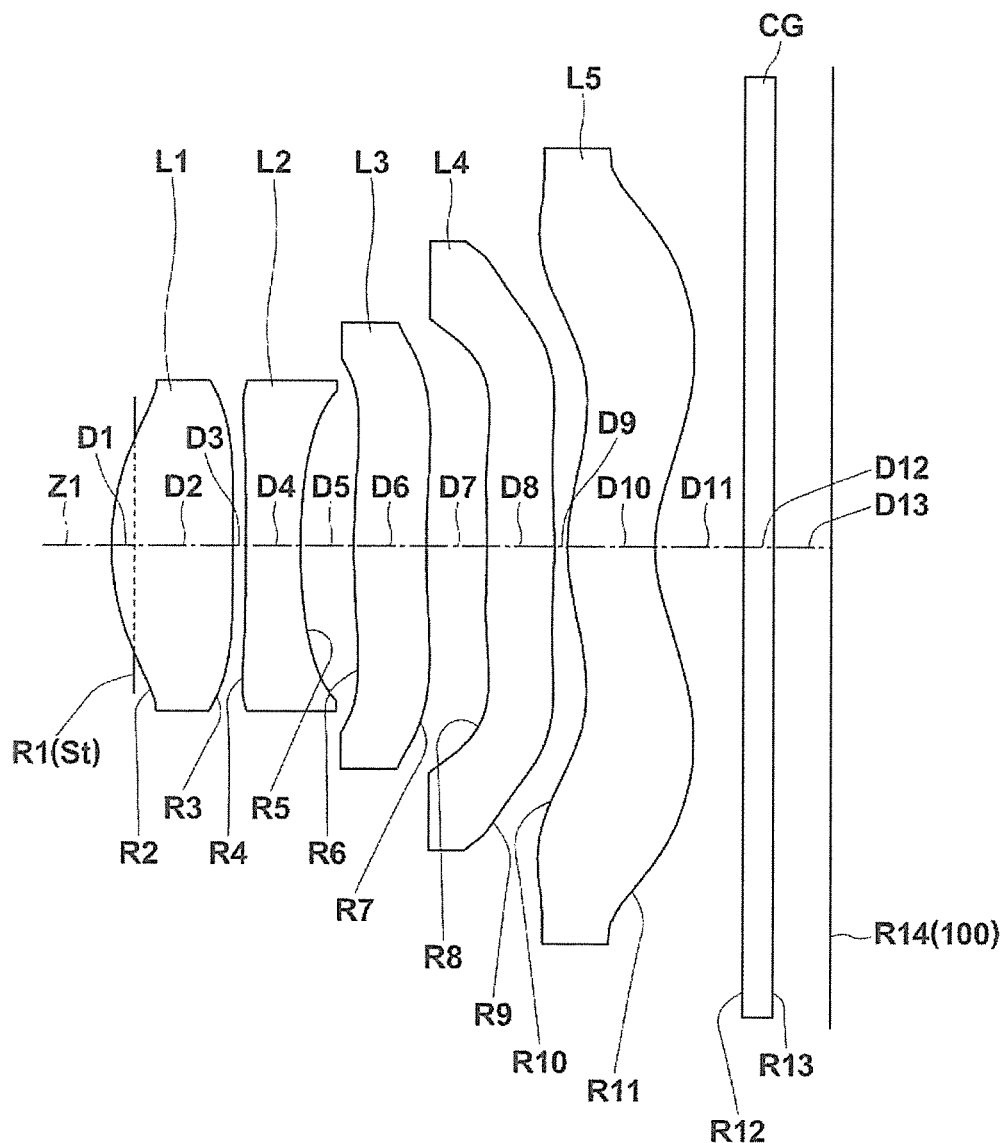
FIG. 3 is a sectional diagram that illustrates a third example of the configuration of an imaging lens according to an embodiment of the disclosure, and corresponds to a lens of Example 3.
Figure 4:
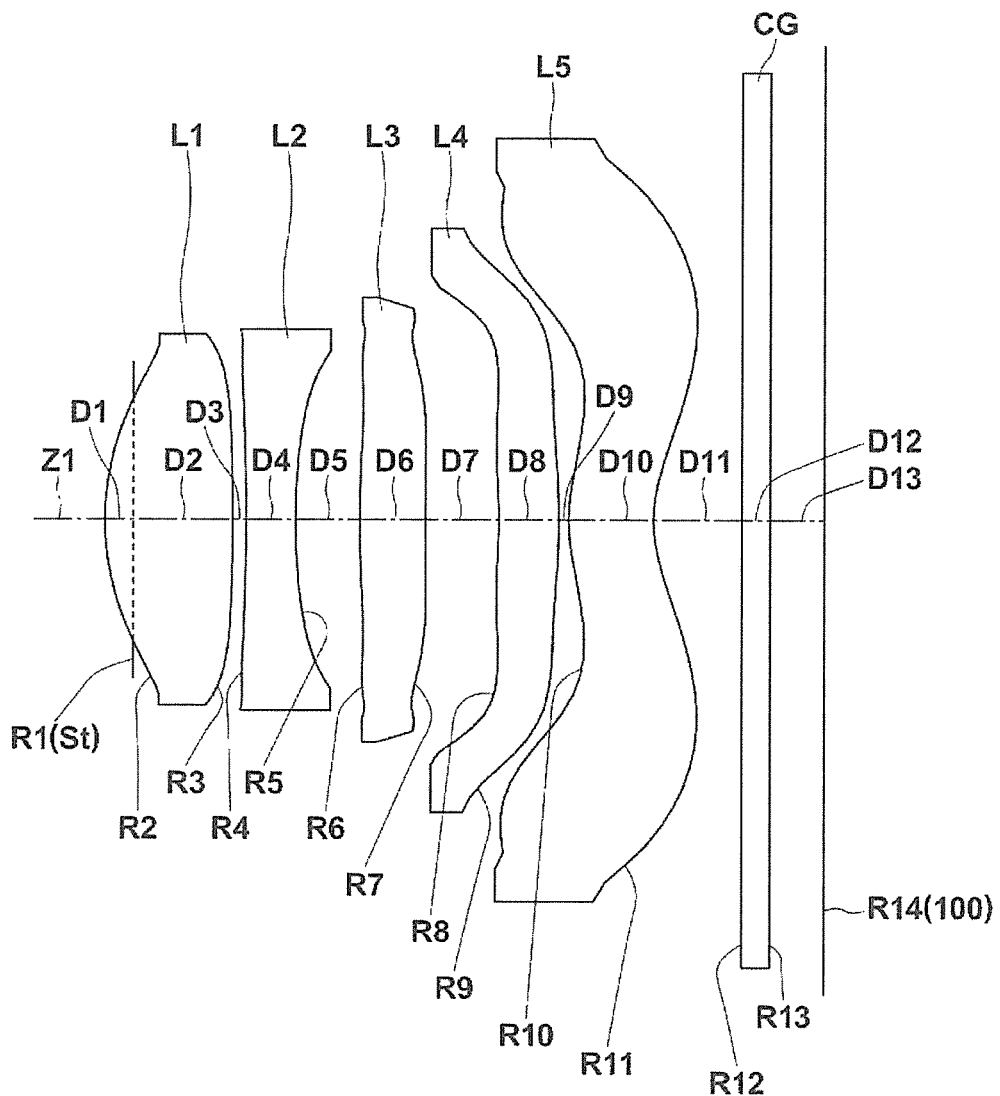
FIG. 4 is a sectional diagram that illustrates a fourth example of the configuration of an imaging lens according to an embodiment of the disclosure, and corresponds to a lens of Example 4.
Figure 5:
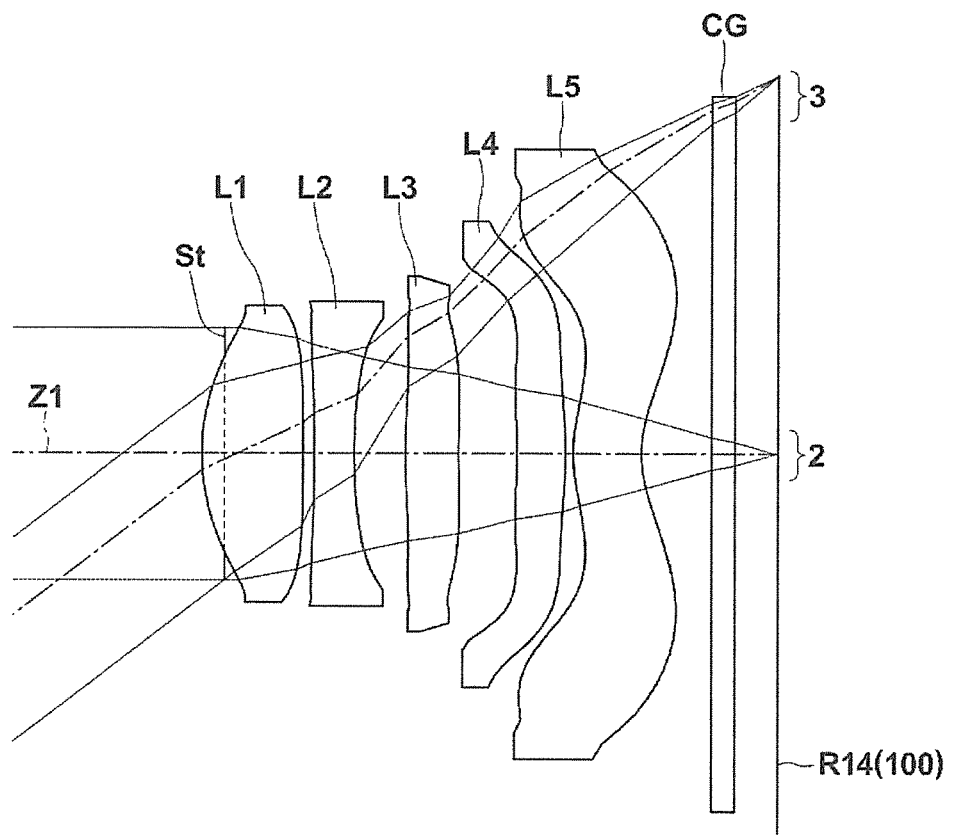
FIG. 5 is a diagram that illustrates the paths of light rays that pass through the imaging lens illustrated in FIG. 4.

FIG. 1 illustrates a first example of the configuration of an imaging lens according to a first embodiment of the disclosure. This example of the configuration corresponds to the lens configuration of a first Numerical Example 1 (Table 1 and Table 2), to be described later. Similarly, FIG. 2 through FIG. 4 are sectional diagrams that illustrate second through fourth examples of the configurations corresponding to the imaging lenses of the second embodiment through the fourth embodiment (to be described later). The second through fourth examples of the configurations correspond to the lens configurations of the second through the fourth Numerical Examples (Table 3 through Table 8) to be described later. In FIGS. 1 through 4, the symbol Ri represents the radii of curvature of ith surfaces, i being lens surface numbers that sequentially increase to the image side (imaging side), with the surface of most-object-side lens element designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 4 will also be described as necessary. In addition, FIG. 5 is a diagram that illustrates the paths of light rays that pass through the imaging lens L of FIG. 4, and illustrates the paths of axial light rays 2 and light rays 3 of a maximum angle of view exited from an object at an infinity distance.

The imaging lens L of the embodiment of the disclosure is favorably employed in various imaging devices that employ image sensors such as a CCD and a CMOS. The imaging lens L of the embodiment of the disclosure is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, disposed in this order from the object side.

FIG. 10 schematically illustrates a cellular telephone as an imaging apparatus 1 according to an embodiment of the disclosure. The imaging apparatus 1 of the embodiment of the disclosure is equipped with the imaging lens L according to the embodiment of the disclosure and an image sensor 100 (refer to FIG. 1) such as a CCD that outputs image signals corresponding to optical images formed by the imaging lens L. The image sensor 100 is provided at an image formation plane (imaging surface R14) of the imaging lens L.

FIG. 11 schematically illustrates a smart phone as an imaging apparatus 501 according to an embodiment of the disclosure. The imaging apparatus 501 of the embodiment of the disclosure is equipped with a camera section 541 having the imaging lens L according to the embodiment of the disclosure and an image sensor 100 (refer to FIG. 1) such as a CCD that outputs image signals corresponding to optical images formed by the imaging lens L. The image sensor 100 is provided at an image formation plane (imaging surface R14) of the imaging lens L.

Various optical members CG may be provided between the fifth lens L5 and the image sensor 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects may be utilized as the optical member CG.

Alternatively, the optical member CG may be omitted, and a coating may be administered on the fifth lens L5 to obtain the same effect as that of the optical member CG. Thereby, the number of parts can be reduced, and the total length can be shortened.

It is preferable for the imaging lens L to be equipped with an aperture stop St positioned at the object side of the object-side surface of the second lens L2. By positioning the aperture stop St at the object side of the object-side surface of the second lens L2 in this manner, increases in the incident angles of light rays that pass through the optical system and enter the image formation plane (image sensor) can be suppressed, particularly at peripheral portions of an imaging region. It is preferable for the aperture stop St to be positioned at the object side of the object-side surface of the first lens L1 in order to cause this advantageous effect to become more prominent. Note that the expression "positioned at the object side of the object-side surface of the second lens" means that the position of the aperture stop in the direction of the optical axis is at the same position as the intersection of marginal axial rays of light and the object-side surface of the second lens L2, or at the object side of this position. Similarly, the expression "positioned at the object side of the object-side surface of the first lens" means that the position of the aperture stop in the direction of the optical axis is at the same position as the intersection of marginal axial rays of light and the object-side surface of the first lens L1, or at the object side of this position.

Further, it is preferable for the aperture stop St to be positioned at the image side of the vertex of a surface of the first lens L1 when the aperture stop St is positioned at the object side of the object-side surface of the first lens L1 along the optical axis. By positioning the aperture stop St at the image side of the vertex of the surface of the first lens L1 in this manner, the total length of the imaging lens including the aperture stop St can be shortened. Note that the imaging lenses according to the first embodiment through the fourth embodiment (FIG. 1 through FIG. 4) are the examples of the configurations in which the aperture stop St is positioned at the object side of the-object-side surface of the first lens L1, and the aperture stop St is positioned at the image side of the vertex of the surface of the first lens L1. In addition, the aperture stop St may be positioned at the object side of the vertex of the surface of the first lens L1, but not limited to the present embodiment. Positioning the aperture stop St at the object side of the vertex of the surface of the first lens L1 is slightly more disadvantageous from the viewpoint of securing the amount of peripheral light rays compared to a case in which the aperture stop St is positioned at the image side of the vertex of the surface of the first lens L1. However, increases in the incident angles of light rays that pass through the optical system and enter the image formation surface (image sensor) at the peripheral portions of the imaging region can be more favorably suppressed.

In this imaging lens L, the first lens L1 has a biconvex shape in the vicinity of the optical axis with the surface having a paraxial radius of curvature with the smaller absolute value toward the object side. In the case that the first lens L1 has a biconvex shape in the vicinity of the optical axis, the first lens L1, i.e., the most-object-side lens can easily have a positive refractive power which is sufficiently strong to favorably realize a shortened total length. Therefore, the total length can be favorably shortened. In order to realize a first lens L1 having a positive refractive power of approximately the same strength in the vicinity of the optical axis, the absolute value of the paraxial radius of curvature of the first lens L1 can be relatively increased in the case that the first lens L1 is of a biconvex shape in the vicinity of the optical axis compared to a case in which the first lens L1 is of a meniscus shape in the vicinity of the optical axis. For this reason, spherical aberration and comatic aberration can be more favorably corrected in the case the first lens L1 is of a biconvex shape in the vicinity of the optical axis. Further, the position of the rearward principal point of the first lens L1 can be closer to the object side in the case that the first lens L1 is of a biconvex shape with a surface having a paraxial radius of curvature with the smaller absolute value toward the object side compared to a case in which the first lens L1 is of a biconvex shape with a surface having a paraxial radius of curvature with the smaller absolute value toward the image side. Therefore, the total length can be more favorably shortened.

The second lens L2 has a negative refractive power in the vicinity of the optical axis. Thereby, spherical aberration and longitudinal chromatic aberration generated when the light rays pass through the first lens L1 can be favorably corrected. Further, the second lens L2 has a concave surface toward the image side in the vicinity of the optical axis. Thereby, the position of the rearward principal point of the second lens L2 can be closer to the object side. Therefore, the total length can be favorably shortened. Further, it is preferable for the second lens L2 to be of a biconcave shape in the vicinity of the optical axis. In order to realize a second lens L2 having a negative refractive power of approximately the same strength in the vicinity of the optical axis, the absolute value of the paraxial radius of curvature of the second lens L2 can be relatively increased in the case that the second lens L2 is of a biconcave shape in the vicinity of the optical axis compared to a case that the second lens L2 is of a meniscus shape in the vicinity of the optical axis. For this reason, the occurrence of spherical aberration can be more favorably suppressed in the case that the second lens L2 is of a biconcave shape in the vicinity of the optical axis. Further, it is preferable for the second lens L2 to be of a biconcave shape in the vicinity of the optical axis and to have the surface having the paraxial radius of curvature with the smaller absolute value toward the image side as shown in the first embodiment. In this case, spherical aberration can be favorably corrected by the second lens L2 being of a biconcave shape in the vicinity of the optical axis, while the position of the rearward principal point of the second lens L2 can be closer to the object side by the second lens L2 being with the surface having the paraxial radius of curvature with the smaller absolute value toward the image side. Therefore, the total length can be shortened more favorably.

It is preferable for the third lens L3 to have a positive refractive power in the vicinity of the optical axis. Thereby, spherical aberration can be more favorably corrected. In addition, the third lens L3 is of a meniscus shape with a convex surface toward the object side in the vicinity of the optical axis, as shown in the first embodiment. In the case that the third lens L3 is of a meniscus shape with a convex surface toward the object side in the vicinity of the optical axis, the position of the rearward principal point of the third lens L3 can be more suitably closer to the objet side. Thereby, shortening the total length can be preferably achieved.

The fourth lens L4 has a negative refractive power in the vicinity of the optical axis. By the fourth lens L4 and the fifth lens L5 to be described below having negative refractive powers in the vicinity of the optical axis, the imaging lens can be a telephoto-type configuration as a whole, in which the first lens L1 through the third lens L3 are considered to be one optical system having a positive refractive power and the fourth lens L4 and the fifth lens L5 are considered to be one optical system having a negative refractive power. Thereby, the position of the rearward principal point of the imaging lens as a whole can be closer to the objet side, and the total length can be suitably shortened. Further, the fourth lens L4 is of a meniscus shape with a convex surface toward the image side in the vicinity of the optical axis as shown in the first embodiment. Thereby, astigmatism can be favorably corrected.

The fifth lens L5 has a negative refractive power in the vicinity of the optical axis. As describe above, by disposing a lens having a negative refractive power in the vicinity of the optical axis at the most-image side of the imaging lens, the imaging lens can be a telephoto type configuration as a whole more favorably, and the total length can be suitably shortened. In addition, by the fifth lens L5 having a negative refractive power in the vicinity of the optical axis, field curvature can be favorably corrected. Further, the fifth lens L5 is of a meniscus shape with a concave surface toward the image side in the vicinity of the optical axis. Thereby, the total length can be more suitably shortened, and field curvature can be favorably corrected.

Further, the fifth lens L5 has at least one inflection point within the effective diameter of the image-side surface. The term "inflection point" on the image-side surface of the fifth lens L5 refers to a point at which the image-side surface shape of the fifth lens L5 changes from a convex shape to a concave shape (or from a concave shape to a convex shape) with respect to the image side. The inflection point may be provided at any radially outward positions from the optical axis within the effective diameter of the image-side surface of the fifth lens L5. It is preferable for the inflection point to be provided at positions within a range from 40% to 70% of the maximum effective diameter of the fifth lens L5 in a radially outward direction from the optical axis. Configuring the image-side surface of the fifth lens L5 to be of a shape having at least one inflection point as shown in the first embodiment can suppress increases in the incident angles of light rays that pass through the optical system and enter the image formation plane (image sensor) particularly at peripheral portions of an imaging region. Note that the peripheral portions herein refer to portions which are radially outward from positions at approximately 50% to 70% of the maximum effective diameter of the lens, radially outward from the optical axis.

In the imaging lens L1 described above, the configuration of each lens element of the first lens L1 through the fifth lens L5 is optimized within a lens configuration having five lenses as a whole. Therefore, a lens system that achieves shortening the total length and has high resolution can be realized.

In this imaging lens L, it is preferable for an aspherical surface to be applied for at least one surface of each lens of the first lens L1 through the fifth lens L5 in order to achieve improved imaging performance.

Further, it is preferable for each of the lens L1 through the lens L5 that constitute the imaging lens L to be not a cemented lens but a single lens. This is because the number of aspherical surface lenses is greater than a case in which any of the lenses L1 through L5 is a cemented lens, thereby a degree of freedom for design of each lens will increase to achieve the shortened total length favorably.

Next, the operation and effects regarding the conditional formulae of the imaging lens L configured as described above will be described in detail.

First, it is preferable for the focal length f of the entire system and the combined focal length f45 of the fourth lens L4 and the fifth lens L5 to satisfy conditional formula (1) below:

$$-0.6 < f/f45 < -0.1 \qquad (1).$$

Conditional formula (1) defines a preferable range of numerical values for the ratio of the focal length f of the entire system with respect to the combined focal length of the fourth lens L4 and the fifth lens L5. When the value of f/f45 falls below the lower limit defined by conditional formula (1), the negative refractive powers of the fourth lens L4 and the fifth lens L5 will become excessively strong with respect to the refractive power of the entire system. Thereby, it will become difficult to sufficiently suppress increase in the incident angles of light rays that pass through the optical system and enter the image formation plane (image sensor) particularly at the intermediate angle of view. In addition, when the value of f/f45 exceeds the upper limit defined by conditional formula (1), the negative refractive powers of two lenses, the fourth lens L4 and the fifth lens L5 will become excessively weak with respect to the refractive power of the entire system. Thereby, it will become difficult to cause the position of the rearward principal point to be sufficiently closer to the object side, which is disadvantageous from the viewpoint of shortening the total length. Therefore, the position of the rearward principal point can be sufficiently closer to the object side while the total length can be favorably shortened, by conditional formula (1) being satisfied. Further, increase in the incident angles of light rays that pass through the optical system and enter the image formation plane (image sensor) can be suppressed, particularly at peripheral portions of an imaging region. It is more preferable for conditional formula (1-1) to be satisfied in order to cause this advantageous effect to become more prominent:

$$-0.42 < f/f45 < -0.23 \quad (1\text{-}1).$$

Further it is preferable for the focal length f of the entire system, a half angle of view ω, a paraxial radius of curvature R5r of the image-side surface of the fifth lens L5 to satisfy conditional formula (2) below:

$$0.5 < f \cdot \tan \omega / R5r < 10 \quad (2).$$

Conditional formula (2) defines a preferable range of numerical values for the ratio of the paraxial image height (f·tan ω) with respect to the paraxial radius of curvature R5r of the image-side surface of the fifth lens L5. When the value of f·tan ω/R5r falls below the lower limit defined by conditional formula (2), the absolute value of the paraxial radius of curvature R5r of the image-side surface of the fifth lens L5, i.e., the most-image side surface of the imaging lens, will become excessively large with respect to the paraxial image height (f·tan ω). Thereby, it will become difficult to correct field curvature sufficiently while achieving the shortened total length. Further, when the value of f·tan ω/R5r exceeds the upper limit defined by conditional formula (2), the absolute value of the paraxial radius of curvature R5r of the image-side surface of the fifth lens L5, i.e., the most-image side surface of the imaging lens, will become excessively small with respect to the paraxial image height (f·tan ω). Thereby, it will become difficult to suppress increase in the incident angles of light rays that pass through the optical system and enter the image formation plane (image sensor) at the intermediate angle of view. For this reason, the increase in the incident angles of light rays that pass through the optical system and enter the image formation plane (image sensor) at the intermediate angle of view can be favorably suppressed while the total length can be shortened, by the range defined by conditional formula (2) being satisfied. Further, field curvature can be favorably corrected as well. It is preferable for conditional formula (2-1) to be satisfied in order to cause this advantageous effect to become more prominent:

$$1.5 < f \cdot \tan \omega / R5r < 4.5 \quad (2\text{-}1).$$

It is preferable for the focal length f3 of the third lens L3 and the focal length f1 of the first lens L1 to satisfy conditional formula (3) below:

$$1 < f3/f1 < 10 \quad (3).$$

Conditional formula (3) defines a preferable range of numerical values for the ratio of the focal length f3 of the third lens L3 with respect to the focal length f1 of the first lens L1. When the value of f3/f1 falls below the lower limit defined by conditional formula (3), the refractive power of the third lens L3 will become excessively strong with respect to the refractive power of the first lens L1. Thereby, it will become difficult to realize a shortened total length. When the value of f3/f1 exceeds the upper limit defined by conditional formula (3), the refractive power of the third lens L3 will become excessively weak with respect to the refractive power of the first lens L1. Thereby, it will become difficult to correct spherical aberration favorably. For this reason, the total length can be shortened while spherical aberration can be favorably corrected by the range defined by conditional formula (3) being satisfied. It is preferable for conditional formula (3-1) to be satisfied in order to cause this advantageous effect to become more prominent:

$$2.5 < f3/f1 < 8 \quad (3\text{-}1).$$

It is preferable for the paraxial radius of curvature R3f of the object-side surface of the third lens L3 and the paraxial radius of curvature R3r of the image-side surface of the third lens L3 to satisfy conditional formula (4) below:

$$-1 < (R3f - R3r)/(R3f + R3r) < 0 \quad (4).$$

Conditional formula (4) respectively defines preferable ranges of numerical values for the paraxial radius of curvature R3f of the object-side surface of the third lens L3 and the paraxial radius of curvature R3r of the image-side surface of the third lens L3. When the value of (R3f−R3r)/(R3f+R3r) falls below the lower limit defined by conditional formula (4), such a configuration is disadvantageous from the viewpoint of shortening the total length. When the value of (R3f−R3r)/(R3f+R3r) exceeds the upper limit defined by conditional formula (4), it will become difficult to correct spherical aberration. Therefore, the total length can be shortened suitably while spherical aberration can be corrected favorably by conditional formula (4) being satisfied. It is more preferable for conditional formula (4-1) below to be satisfied in order to cause this advantageous effect to become more prominent:

$$-0.8 < (R3f - R3r)/(R3f + R3r) < -0.2 \quad (4\text{-}1).$$

Further, it is preferable for the paraxial radius of curvature R3f of the object-side surface of the third lens L3 and the paraxial radius of curvature R2r of the image-side surface of the second lens L2 to satisfy conditional formula (5) below:

$$-1 < (R2r - R3f)/(R2r + R3f) < 0 \quad (5).$$

In both of the case that the value of (R2r−R3f)/(R2r+R3f) exceeds the upper limit defined by conditional formula (5) and the case that the value of (R2r−R3f)/(R2r+R3f) falls below the lower limit defined by conditional formula (5), the occurrence of comatic aberration will be likely to be induced due to increase in the absolute value of offense against the sine condition. Thereby, it will become difficult to correct comatic aberration sufficiently. Therefore, the increase in the absolute value of offense against the sine condition can be suppressed so as to set offense against the sine condition appropriately particularly at a small angle of view by conditional formula (5) being satisfied. Thereby, comatic aberration can be favorably corrected. It is more preferable for conditional formula (5-1) below to be satisfied in order to cause this advantageous effect to become more prominent:

$$-0.3 < (R2r - R3f)/(R2r + R3f) < -0.05 \quad (5\text{-}1).$$

It is preferable for the focal length f1 of the first lens L1 and the focal length f of the entire system to satisfy conditional formula (6) below:

$$0.8 < f/f1 < 1.5 \quad (6).$$

Conditional formula (6) defines a preferable range of numerical values for the ratio of the focal length f of the entire system with respect to the focal length f1 of the first lens L1. When the value of f/f1 falls below the lower limit defined by conditional formula (6), a positive refractive power of the first lens L1 will become excessively weak with respect to the refractive power of the entire system. Thereby, it will become difficult to achieve the shortened total length.

When the value of f/f1 exceeds the upper limit defined by conditional formula (6), the positive refractive power of the first lens L1 will become excessively strong with respect to the refractive power of the entire system. Thereby, it will become difficult to correct particularly spherical aberration. Therefore, the total length can be shortened while spherical aberration can be corrected favorably by conditional formula (6) being satisfied. It is more preferable for conditional formula (6-1) to be satisfied in order to cause this advantageous effect to become more prominent:

$$0.9 < f/f1 < 1.4 \quad (6-1).$$

Further, it is preferable for the focal length f3 of the third lens L3 and the focal length f of the entire system to satisfy conditional formula (7) below:

$$0.1 < f/f3 < 0.6 \quad (7).$$

Conditional formula (7) defines a preferable range of numerical values for the ratio of the focal length f of the entire system with respect to the focal length f3 of the third lens L3. When the value of f/f3 falls below the lower limit defined by conditional formula (7), the refractive power of the third lens L3 will become excessively weak with respect to the refractive power of the entire system. Thereby, it will become difficult to shorten the total length. When the value of f/f3 exceeds the upper limit defined by conditional formula (7), the refractive power of the third lens L3 will become excessively strong with respect to the refractive power of the entire system. Thereby, it will become difficult to correct spherical aberration. Therefore, the total length can be shortened while spherical aberration can be corrected favorably by conditional formula (7) being satisfied. It is more preferable for conditional formula (7-1) to be satisfied in order to cause this advantageous effect to become more prominent:

$$0.15 < f/f3 < 0.4 \quad (7-1).$$

It is preferable for the focal length f2 of the second lens L2 and the focal length f of the entire system to satisfy conditional formula (8) below:

$$-1 < f/f2 < -0.2 \quad (8).$$

Conditional formula (8) defines a preferable range of numerical values for the ratio of the focal length f of the entire system with respect to the focal length f2 of the second lens L2. When the value of f/f2 falls below the lower limit defined by conditional formula (8), the refractive power of the second lens L2 will become excessively strong with respect to the positive refractive power of the entire system, and shortening of the total length will become difficult. When the value of f/f2 exceeds the upper limit defined by conditional formula (8), the refractive power of the second lens L2 will become excessively weak with respect to the refractive power of the entire system. Thereby, it will become difficult to correct longitudinal chromatic aberration. Therefore, the total length can be shortened while longitudinal chromatic aberration can be corrected favorably, by the range defined by conditional formula (8) being satisfied. It is more preferable for conditional formula (8-1) to be satisfied in order to cause this advantageous effect to become more prominent:

$$-0.8 < f/f2 < -0.5 \quad (8-1).$$

Further, it is preferable for the distance D7 between the third lens L3 and the fourth lens L4 along the optical axis and the focal length f of the entire system to satisfy conditional formula (9) below:

$$0.05 < D7/f < 0.2 \quad (9).$$

Conditional formula (9) defines a preferable range of numerical values for the ratio of the distance D7 between the third lens L3 and the fourth lens L4 along the optical axis with respect to the focal length f of the entire system. As described above, the imaging lens according to each of the present embodiments is configured to be a telephoto type as a whole when the first lens L1 through the third lens L3 are considered one optical system (a first lens group) having a positive refractive power while the fourth lens L4 and the fifth lens L5 are considered one optical system (a second lens group) having a negative refractive power. When the value of D7/f falls below the lower limit defined by conditional formula (9), the distance between the first lens group and the second lens group along the optical axis will become excessively small. This will diminish the advantageous effect from the viewpoint of shortening the total length obtained by configuring the imaging lens L to be a telephoto type as described above. In addition, when the value of D7/f exceeds the upper limit defined by conditional formula (9), it will be likely to become necessary to increase the negative refractive power of the second lens group with respect to the positive refractive power of the first lens group. Thereby, it will become difficult to correct astigmatism favorably. Therefore, the total length can be shortened and astigmatism can be corrected favorably, by the range defined by conditional formula (9) being satisfied.

Next, referring to FIG. 2 through FIG. 4, the imaging lenses according to the second embodiment through the fourth embodiment of the disclosure will be described in detail. The imaging lenses according to the first embodiment through the fourth embodiment illustrated in FIG. 1 through FIG. 4 are configured in such a manner that all of the surfaces of the first lens L1 through the fifth lens L5 are of aspherical surface shapes. In addition, each of the imaging lenses according to the second embodiment through the fourth embodiment consists of a first lens L1 having a biconvex shape in the vicinity of the optical axis with the surface having the paraxial radius of curvature with the smaller absolute value toward the object side, a second lens L2 having a negative refractive power in the vicinity of the optical axis with a concave surface toward the image side in the vicinity of the optical axis, a third lens L3 having a meniscus shape with a convex surface toward the object side in the vicinity of the optical axis, a fourth lens L4 having a negative refractive power and a meniscus shape with a convex surface toward the image side in the vicinity of the optical axis, and a fifth lens L5 having a negative refractive power in the vicinity of the optical axis and a meniscus shape with a concave surface toward the image side in the vicinity of the optical axis, the image-side surface thereof having at least one inflection point, disposed in this order from the object side in the same manner as the first embodiment. For this reason, only the other detailed configuration of each lens that constitutes each lens group of the first embodiment through the fourth embodiment below will be described. In addition, the operational effects of configurations which are common among the first embodiment through the fourth embodiment are the same. Therefore, the configurations and the operational effects thereof will be described for lower numbered embodiment, and the common configurations and the operational effects thereof will be omitted for the other embodiments.

In addition, the second lens L2 can be of a meniscus shape with a concave surface toward the image side in the vicinity of the optical axis as shown in the second embodiment of FIG. 2. In this case, the second lens L2 has a surface having a positive refractive power toward the object side in the vicinity of the optical axis and a surface having a negative refractive power toward the image side in the vicinity of the optical axis. Therefore, the shortened total length can be more easily realized. In the second embodiment, the lens configurations of the third lens L3 through the fifth lens L5 are the same as those of the first embodiment. The respective configurations of these lenses can exhibit the same operational effect as that of the corresponding lenses of the first embodiment.

The imaging lenses L according to the third embodiment through the fourth embodiment illustrated in FIG. 3 and FIG. 4 have the lens configurations which are common among the first lens L1 through the fifth lens L5 of the first embodiment. The respective configurations of these lenses can exhibit the same operational effects as the corresponding lenses of the first embodiment.

As described above, in the imaging lenses of the embodiments of the disclosure, the configuration of each lens element is optimized within a lens configuration having five lenses as a whole. Therefore, a lens system that can achieve a shortened total length while having high imaging performance can be realized.

Further, improved imaging performance can be realized by appropriately satisfying preferred conditions. In addition, the imaging apparatuses according to the embodiments of the disclosure output image signals corresponding to optical images formed by the high performance imaging lenses according to the embodiments of the disclosure. Therefore, photographed images having high resolution from a central angle of view to peripheral angles of view can be obtained.

Next, specific examples of numerical values of the imaging lens of the disclosure will be described. A plurality of examples of numerical values will be summarized and explained below.

Table 1 and Table 2 below show specific lens data corresponding to the configuration of the imaging lens illustrated in FIG. 1. Specifically, Table 1 shows basic lens data of the imaging lens, and Table 2 shows data related to aspherical surfaces. In the lens data of Table 1, ith numbers of the surfaces of lens elements that sequentially increase from the object side to the image side, with the lens element at the most object side designated as first (the aperture stop St is first), are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1 st surface Si+1 from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. In addition, Table 1 also shows the focal length f (mm) of the entire system and the back focus Bf (mm) as various data. Note that the back focus Bf is represented as an air converted value.

In the imaging lens of Example 1, both of the surfaces of all of the first lens L1 through the fifth lens L5 are aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E−02" indicates that the numerical value is "1.0·10⁻²".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$z = C \cdot h^2 / \{1 + (1 - KA \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and KA is an aspherical surface coefficient.

Table 3 through Table 8 show specific lens data corresponding to the configurations of the imaging lenses illustrated in FIG. 2 through FIG. 4 as Example 2 through Example 4, in the same manner as the imaging lens of Example 1 above. In each of the imaging lenses according to Examples 1 through 4, both surfaces of the first lens L1 through the fifth lens L5 are of aspherical surface shapes.

A through E of FIG. 6 are diagrams that illustrate aberrations of the imaging lens of Example 1, wherein the diagrams respectively illustrate spherical aberration, offense against the sine condition, astigmatism, distortion, and lateral chromatic aberration (chromatic aberration of magnification) of the imaging lens of Example 1. Each of the diagrams that illustrate spherical aberration, offense against the sine condition, astigmatism (field curvature), and distortion illustrate aberrations using the d line (wavelength: 587.56 nm) as a reference wavelength. The diagrams that illustrate spherical aberration and lateral chromatic aberration also show aberrations related to the F line (wavelength: 486.1 nm) and the C line (wavelength: 656.27 nm). In addition, the diagram that illustrates spherical aberration also shows aberration related to the g line (wavelength: 435.83 nm). In the diagram that illustrates astigmatism, aberration in the sagittal direction S is indicated by a solid line, while aberration in the tangential direction T is indicated by a broken line. In addition, "Fno." denotes an F number, and "ω" denotes a half angle of view.

Similarly, various aberrations of the imaging lenses of Example 2 through Example 4 are illustrated in A through E of FIG. 7 through A through E of FIG. 9.

Further, Table 9 shows values corresponding to conditional formulae (1) through (4) according to the disclosure, which are respectively summarized for each of Examples 1 through 9.

As can be understood from each set of numerical value data and from the diagrams that illustrate aberrations, each of the Examples realizes the shortening of the total length while achieving high imaging performance.

Note that the imaging lens of the disclosure is not limited to the embodiments and each of the Examples, and various modifications are possible. For example, the values of the radii of curvature, the distances among surfaces, the refractive indices, the Abbe's numbers, the aspherical surface coefficients of the respective lens components, etc., are not limited to the numerical values indicated in connection with the Examples of numerical values, and may be other values.

In addition, the Examples are described under the presumption that the imaging lenses are to be utilized with fixed focus. However, it is also possible for configurations capable of adjusting focus to be adopted. It is also possible to adopt a configuration, in which the entirety of the lens system is fed out or a portion of the lenses is moved along the optical axis to enable automatic focus, for example. In each lens having a meniscus shape in the vicinity of the optical axis within the imaging lens of the disclosure, the surface having the paraxial radius of curvature with the greater absolute value within the meniscus shape may be configured to be planar in the vicinity of the optical axis. In other words, a lens of a meniscus shape in the vicinity of the optical axis may be of a plano-convex shape or of a plano-concave shape in which the surface having the radius of curvature with the greater absolute value within the meniscus shape of the lens is planar in the vicinity of the optical axis.

TABLE 1

EXAMPLE 1
f = 4.048, Bf = 1.112

| Si | Ri | Di | Ndj | vdj |
|---|---|---|---|---|
| 1(Aperture Stop) | ∞ | −0.150 | | |
| *2 | 1.68882 | 0.753 | 1.54488 | 54.87 |
| *3 | −469.14531 | 0.075 | | |
| *4 | −68.53889 | 0.360 | 1.63351 | 23.63 |
| *5 | 3.91876 | 0.385 | | |
| *6 | 4.66774 | 0.480 | 1.54488 | 54.87 |
| *7 | 9.50695 | 0.425 | | |
| *8 | −4.38710 | 0.421 | 1.63351 | 23.63 |
| *9 | −4.69773 | 0.112 | | |
| *10 | 1.34963 | 0.554 | 1.54488 | 54.87 |
| *11 | 0.99224 | 0.583 | | |
| 12 | ∞ | 0.250 | 1.51633 | 64.14 |
| 13 | ∞ | 0.364 | | |
| 14 | ∞ | | | |

*Aspherical Surface

TABLE 2

EXAMPLE 1 Aspherical Surface Data

| Surface Numbers | KA | A3 | A4 | A5 | A6 |
|---|---|---|---|---|---|
| 2 | −1.6617652E+01 | 5.4744700E−02 | −5.9377163E−01 | 1.0041325E+01 | −5.6165001E+01 |
| 3 | 9.7516247E+01 | 2.4925745E−02 | −2.6523618E−01 | 5.7875259E−01 | −8.6923694E−01 |
| 4 | −1.0000090E+00 | 4.2732603E−03 | −1.3754838E−01 | 3.5304565E−01 | −4.5775303E−01 |
| 5 | −4.8686132E−02 | 3.4198334E−02 | −2.0939388E−01 | 8.3542775E−01 | −1.7507871E+00 |
| 6 | −1.5062912E+02 | −7.3351663E−02 | 7.2570993E−01 | −2.0211678E+00 | 2.6113106E+00 |
| 7 | 6.6267320E−01 | 8.7275007E−02 | −1.0999753E−01 | 6.8631695E−02 | −1.6680023E−01 |
| 8 | −6.7863443E+01 | 7.3347958E−02 | 4.2003686E−01 | −6.9892210E−01 | 7.2438492E−01 |
| 9 | −1.1824840E+01 | 7.1701889E−02 | −4.5523855E−01 | 2.4549216E+00 | −4.4609449E+00 |
| 10 | −4.9903636E+01 | 4.7396724E−01 | −5.3054363E−01 | −3.4546338E−01 | 6.8887468E−01 |
| 11 | −2.9912659E+00 | 1.8156894E−01 | −1.2870701E+00 | 3.2019363E+00 | −4.9074616E+00 |

| | A7 | A8 | A9 | A10 | A11 |
|---|---|---|---|---|---|
| 2 | 1.7912177E+02 | −3.4276737E+02 | 3.5663726E+02 | −1.1521896E+02 | −4.8427720E+01 |
| 3 | 1.0385757E+00 | −2.3546619E+00 | 3.7768431E+00 | −1.2705325E+00 | −2.4548120E+00 |
| 4 | 1.5726993E−01 | 6.4559779E−02 | 1.5612240E+00 | −4.5074759E+00 | 4.1967649E+00 |
| 5 | 1.5136763E+00 | 2.2643547E+00 | −4.0144184E+00 | −6.5299707E+00 | 2.0094792E+01 |
| 6 | −1.9572097E+00 | 1.3883165E+00 | −1.1573284E+00 | −3.8325696E−01 | 2.5399998E+00 |
| 7 | −2.8107764E−01 | 6.8153032E−01 | 2.2480541E−02 | −7.0651015E−01 | 2.5808755E−01 |
| 8 | −6.6684552E−01 | −4.1350421E−02 | 5.3034575E−01 | −1.4247700E−01 | −1.8119421E−01 |
| 9 | 4.0266189E+00 | −1.7480813E+00 | −1.5432836E−01 | 3.7742231E−01 | 2.6786348E−01 |
| 10 | −7.3567511E−02 | −4.8141750E−01 | 3.9170975E−01 | −1.1177914E−01 | −4.8850161E−03 |
| 11 | 4.5287792E+00 | −2.2108812E+00 | 1.8588249E−01 | 3.7476690E−01 | −1.8833753E−01 |

| | A12 | A13 | A14 | A15 | A16 |
|---|---|---|---|---|---|
| 2 | −2.5384589E+02 | 7.1111339E+02 | −7.1706233E+02 | 3.4253913E+02 | −6.5312938E+01 |
| 3 | −5.8269429E−01 | 5.7043894E+00 | −3.8161961E+00 | −1.5828632E−01 | 5.4705875E−01 |
| 4 | −6.3034744E−01 | −5.2674947E−01 | −8.3477407E−01 | 1.0669357E+00 | −3.1516693E−01 |
| 5 | −1.5519743E+01 | −2.2809819E−01 | 5.4425263E+00 | −1.8060899E+00 | −3.8050295E−02 |
| 6 | −2.0907294E+00 | −7.5266131E−01 | 2.0695625E+00 | −1.0792188E+00 | 1.6366749E−01 |
| 7 | 2.6585778E−01 | −9.8580788E−02 | −1.6127103E−01 | 1.3468449E−01 | −3.2032601E−02 |
| 8 | 3.7160561E−03 | 1.1830339E−01 | −4.8380689E−02 | −4.2420613E−03 | 4.3419229E−03 |
| 9 | −4.1942292E−01 | 9.6762815E−02 | 7.4484911E−02 | −4.4156844E−02 | 6.7322824E−03 |
| 10 | 1.6760022E−02 | −7.8244145E−03 | 1.1921957E−03 | 2.6953153E−04 | −7.8239632E−05 |
| 11 | 3.6695665E−02 | −9.3336620E−03 | 5.6310725E−03 | −1.6409976E−03 | 1.6417980E−04 |

TABLE 3

EXAMPLE 2
f = 3.959, Bf = 1.051

| Si | Ri | Di | Ndj | vdj |
|---|---|---|---|---|
| 1(Aperture Stop) | ∞ | −0.150 | | |
| *2 | 1.69532 | 0.803 | 1.54488 | 54.87 |
| *3 | −469.10214 | 0.075 | | |
| *4 | 69.03481 | 0.360 | 1.63351 | 23.63 |
| *5 | 3.77776 | 0.359 | | |
| *6 | 4.97094 | 0.479 | 1.54488 | 54.87 |
| *7 | 8.75741 | 0.400 | | |
| *8 | −4.25000 | 0.444 | 1.63351 | 23.63 |
| *9 | −4.62836 | 0.079 | | |
| *10 | 1.36431 | 0.577 | 1.54488 | 54.87 |
| *11 | 1.00892 | 0.583 | | |
| 12 | ∞ | 0.200 | 1.51633 | 64.14 |
| 13 | ∞ | 0.336 | | |
| 14 | ∞ | | | |

*Aspherical Surface

TABLE 5

EXAMPLE 3
f = 4.033, Bf = 1.095

| Si | Ri | Di | Ndj | vdj |
|---|---|---|---|---|
| 1(Aperture Stop) | ∞ | −0.150 | | |
| *2 | 1.69358 | 0.799 | 1.54488 | 54.87 |
| *3 | −147.90828 | 0.082 | | |
| *4 | −156.13963 | 0.360 | 1.63351 | 23.63 |
| *5 | 3.84052 | 0.352 | | |
| *6 | 4.76952 | 0.479 | 1.54488 | 54.87 |
| *7 | 8.87709 | 0.400 | | |
| *8 | −4.29912 | 0.441 | 1.63351 | 23.63 |
| *9 | −4.62688 | 0.085 | | |
| *10 | 1.38553 | 0.577 | 1.54488 | 54.87 |
| *11 | 1.01395 | 0.583 | | |
| 12 | ∞ | 0.200 | 1.51633 | 64.14 |
| 13 | ∞ | 0.380 | | |
| 14 | ∞ | | | |

*Aspherical Surface

TABLE 4

EXAMPLE 2 Aspherical Surface Data

| Surface Numbers | KA | A3 | A4 | A5 | A6 |
|---|---|---|---|---|---|
| 2 | −1.6618308E+01 | 4.7060701E−03 | 4.2563993E−01 | −2.8819764E−02 | −1.1845051E+00 |
| 3 | −9.7984909E+01 | 2.1814591E−02 | −2.3680385E−01 | 5.6635847E−01 | −1.3068639E+00 |
| 4 | 1.0000039E+00 | 1.6742212E−03 | −1.2021612E−01 | 3.2106198E−01 | −2.4377210E−01 |
| 5 | −4.3914282E−02 | 2.6602890E−02 | −2.5621208E−01 | 1.8832037E+00 | −8.4044308E+00 |
| 6 | −1.5064811E+02 | −6.4000739E−02 | 5.4034644E−01 | −1.3908947E+00 | 1.2207299E+00 |
| 7 | 5.3874540E−01 | 5.3030845E−02 | −9.6990634E−02 | 3.8120839E−01 | −1.3193992E+00 |
| 8 | −6.7804051E+01 | 3.9746333E−02 | 4.9489401E−01 | −6.3047096E−01 | 1.8594146E−01 |
| 9 | −1.2305855E+01 | 1.1614713E−01 | −1.3308330E+00 | 8.0128530E+00 | −2.4179530E+01 |
| 10 | −5.0040827E+01 | 4.4794364E−01 | −4.7967051E−01 | −5.5363811E−01 | 1.2706869E+00 |
| 11 | −2.9946998E+00 | 2.1745351E−01 | −1.6631437E+00 | 4.5880068E+00 | −7.6749703E+00 |

| | A7 | A8 | A9 | A10 | A11 |
|---|---|---|---|---|---|
| 2 | 8.1073981E−01 | 1.5353088E+00 | −4.8793555E−02 | −6.7876246E+00 | 7.8680623E+00 |
| 3 | 2.1170220E+00 | −3.2246462E+00 | 3.3111542E+00 | −1.9628568E−01 | −2.4403785E+00 |
| 4 | −1.3457076E+00 | 3.7062548E+00 | −3.5709405E+00 | 1.3185780E+00 | −3.5304181E−01 |
| 5 | 2.6293053E+01 | −5.8463486E+01 | 9.2219356E+01 | −9.5696822E+01 | 5.1091608E+01 |
| 6 | 1.3059700E+00 | −5.1806322E+00 | 5.0297985E+00 | 2.5511605E+00 | −9.2051721E+00 |
| 7 | 2.0827220E+00 | −2.5530145E+00 | 2.4600200E+00 | −5.7279312E−01 | −1.8626382E+00 |
| 8 | 6.2074570E−02 | −1.6584810E−01 | −1.3338959E−02 | 4.9471117E−01 | −5.7977092E−01 |
| 9 | 4.8111667E+01 | −6.7259391E+01 | 6.5736001E+01 | −4.3467448E+01 | 1.7504775E+01 |
| 10 | −9.5618042E−01 | 3.2378463E−01 | −5.4315014E−02 | 6.3197800E−03 | 1.5188318E−02 |
| 11 | 7.7840254E+00 | −4.3945871E+00 | 8.2008251E−01 | 4.8211591E−01 | −2.6965987E−01 |

| | A12 | A13 | A14 | A15 | A16 |
|---|---|---|---|---|---|
| 2 | 2.0537203E−01 | −3.8511894E+00 | −6.9037749E−01 | 2.9077558E+00 | −1.0567093E+00 |
| 3 | −8.4689730E−01 | 5.4676999E+00 | −4.6716302E+00 | 1.4013170E+00 | −7.0296929E−02 |
| 4 | −8.5403201E−01 | 4.6872343E+00 | −6.6583465E+00 | 4.0274218E+00 | −9.2534396E−01 |
| 5 | 4.7601275E+00 | −1.9560220E+01 | 1.8815968E+00 | 7.0340993E+00 | −2.7161512E+00 |
| 6 | 5.3252993E+00 | 2.4517841E+00 | −3.8157553E+00 | 1.2501305E+00 | −5.7487461E−02 |
| 7 | 1.8707542E+00 | −9.8084182E−02 | −7.3019485E−01 | 3.9897738E−01 | −6.6429952E−02 |
| 8 | 1.1206801E−02 | 3.9458037E−01 | −2.7610469E−01 | 6.8019524E−02 | −3.5544065E−03 |
| 9 | −2.3348080E+00 | −1.6410850E+00 | 1.0594926E+00 | −2.6540752E−01 | 2.6254529E−02 |
| 10 | −1.1887290E−02 | 2.3508128E−03 | −5.2180600E−04 | 4.0022926E−04 | −8.1928274E−05 |
| 11 | −2.0356985E−02 | 5.3443197E−02 | −1.7950846E−02 | 2.5847219E−03 | −1.4036137E−04 |

TABLE 6

EXAMPLE 3 Aspherical Surface Data

| Surface Numbers | KA | A3 | A4 | A5 | A6 |
|---|---|---|---|---|---|
| 2 | −1.6615159E+01 | 1.0235179E−02 | 4.3789349E−01 | −2.3592416E−01 | −1.4234251E−01 |
| 3 | −9.7984909E+01 | 1.2105887E−02 | −2.3369709E−01 | 5.3800250E−01 | −8.1346933E−01 |
| 4 | −1.0001001E+00 | −8.6680362E−03 | −9.2377581E−02 | 2.5088643E−02 | 1.6489770E+00 |
| 5 | −4.4083711E−02 | 3.3802673E−02 | −2.2151567E−01 | 8.1863379E−01 | −1.4586030E+00 |
| 6 | −1.5035170E+02 | −7.2927158E−02 | 6.0917344E−01 | −1.7373082E+00 | 2.7012654E+00 |
| 7 | 5.5947208E−01 | 6.2120584E−02 | −8.1232114E−02 | 1.4190253E−01 | −3.8791059E−01 |
| 8 | −6.7780371E+01 | 3.4750303E−02 | 5.0948672E−01 | −6.4506031E−01 | 2.1603524E−01 |
| 9 | −1.2308597E+01 | 4.9983291E−02 | −2.2893934E−01 | 1.5212522E+00 | −2.3195485E+00 |
| 10 | −5.0036874E+01 | 4.5138122E−01 | −5.0437187E−01 | −4.3617530E−01 | 9.8695042E−01 |
| 11 | −2.9940939E+00 | 1.6779667E−01 | −1.3624540E+00 | 3.4818957E+00 | −5.3492594E+00 |

| | A7 | A8 | A9 | A10 | A11 |
|---|---|---|---|---|---|
| 2 | −2.2867718E+00 | 7.4869401E+00 | −7.1040486E+00 | −2.2309018E+00 | 5.5284633E+00 |
| 3 | 3.0238200E−01 | 1.7208991E−01 | 3.6231763E−01 | −7.3217696E−01 | 5.0732974E−01 |
| 4 | −7.6989476E+00 | 1.5484201E+01 | −1.2328951E+01 | −6.8371527E+00 | 2.1246153E+01 |
| 5 | 3.4924538E+00 | 4.8655833E+00 | −9.7218150E+00 | 6.2775039E+00 | −8.9040598E−01 |
| 6 | −3.1860073E+00 | 2.7417237E+00 | −1.6833673E+00 | 2.1152192E+00 | −2.8553838E+00 |
| 7 | −2.0521744E−01 | 1.0404762E+00 | −7.7637649E−01 | 4.3300455E−01 | −8.8479538E−01 |
| 8 | 1.7687199E−02 | −3.2466898E−01 | 4.6423942E−01 | 6.5952017E−02 | −5.8088316E−01 |
| 9 | 9.7443508E−01 | 8.0047283E−01 | −9.3546825E−01 | −1.8355975E+00 | 8.4018207E−01 |
| 10 | −5.4622334E−01 | −2.8580555E−02 | 9.7693865E−02 | 1.1398837E−02 | −2.4244015E−02 |
| 11 | 4.9242402E+00 | −2.3887459E+00 | 2.2565091E−01 | 2.6938533E−01 | 1.0847227E−02 |

| | A12 | A13 | A14 | A15 | A16 |
|---|---|---|---|---|---|
| 2 | 5.8102947E+00 | −1.4433424E+01 | 9.0229507E+00 | −1.4970900E+00 | −2.5322809E−01 |
| 3 | −6.4298512E−01 | −7.1421750E−01 | 3.4252207E+00 | −3.3038552E+00 | 1.0133061E+00 |
| 4 | −9.7005899E+00 | −1.4004135E+01 | 2.1723757E+01 | −1.1966952E+01 | 2.4990655E+00 |
| 5 | 7.0790829E+00 | −1.6382090E+01 | 1.2972602E+01 | −3.7503474E+00 | 1.1722888E−01 |
| 6 | 3.0591552E−01 | 2.5647893E+00 | −1.7702433E+00 | 6.0357120E−02 | 1.6473344E−01 |
| 7 | 7.8467476E−01 | 1.0549303E−01 | −5.0386267E−01 | 2.6298071E−01 | −4.4056221E−02 |
| 8 | 3.5139781E−01 | 5.1618338E−02 | −1.0409380E−01 | 2.2584117E−02 | 1.4552965E−03 |
| 9 | −5.0582966E−01 | −2.4154312E−03 | 1.3059527E−01 | −5.5880064E−02 | 7.6662056E−03 |
| 10 | 4.7005027E−03 | 1.7073219E−03 | −2.0116241E−03 | 8.5225237E−04 | −1.2522313E−04 |
| 11 | −1.3523249E−01 | 7.3482141E−02 | −1.7656761E−02 | 1.9629424E−03 | −7.4573225E−05 |

TABLE 7

EXAMPLE 4
f = 3.890, Bf = 1.037

| Si | Ri | Di | Ndj | vdj |
|---|---|---|---|---|
| 1(Aperture Stop) | ∞ | −0.180 | | |
| *2 | 1.73202 | 0.816 | 1.54488 | 54.87 |
| *3 | −68.00116 | 0.088 | | |
| *4 | −35.40627 | 0.320 | 1.63351 | 23.63 |
| *5 | 4.49127 | 0.413 | | |
| *6 | 5.23231 | 0.423 | 1.54488 | 54.87 |
| *7 | 23.86077 | 0.467 | | |
| *8 | −3.66536 | 0.388 | 1.63351 | 23.63 |
| *9 | −7.15668 | 0.061 | | |
| *10 | 1.11496 | 0.544 | 1.54488 | 54.87 |
| *11 | 0.91444 | 0.567 | | |
| 12 | ∞ | 0.182 | 1.51633 | 64.14 |
| 13 | ∞ | 0.350 | | |
| 14 | ∞ | | | |

*Aspherical Surface

TABLE 8

EXAMPLE 4 Aspherical Surface Data

| Surface Numbers | KA | A3 | A4 | A5 | A6 |
|---|---|---|---|---|---|
| 2 | −1.6505054E+01 | −9.4230734E−03 | 4.3732179E−01 | 1.2274919E−01 | −2.2396787E+00 |
| 3 | 9.7952568E+01 | 1.4861103E−02 | −1.5613647E−01 | 2.1006182E−01 | 3.3056997E−01 |
| 4 | 9.1720040E−01 | 1.7302390E−03 | −1.1722903E−01 | −1.0234761E−01 | 2.4517025E+00 |
| 5 | −1.1572116E−01 | 5.9305518E−02 | −3.6702555E−01 | 1.0911708E+00 | −1.8829005E+00 |
| 6 | −1.4054841E+02 | −1.5223705E−01 | 9.6478800E−01 | −2.9888387E+00 | 5.4850820E+00 |
| 7 | −9.0860210E−01 | 4.5102749E−03 | −7.9181693E−02 | 5.5311628E−01 | −2.3240867E+00 |
| 8 | −3.3110674E+01 | 5.4793416E−02 | 3.4733798E−01 | −6.5682479E−01 | 1.4291780E+00 |
| 9 | −6.2109955E+00 | −1.2209054E−01 | −1.3639246E+00 | 8.9708766E+00 | −2.4898423E+01 |

TABLE 8-continued

EXAMPLE 4 Aspherical Surface Data

| | | | | | |
|---|---|---|---|---|---|
| 10 | −4.9565805E+01 | 5.6224579E−01 | −9.3073700E−01 | −1.2119950E−01 | 8.4183191E−01 |
| 11 | −2.6957811E+00 | 1.9901642E−01 | −1.3519510E+00 | 2.9282813E+00 | −3.8561343E+00 |

| | A7 | A8 | A9 | A10 | A11 |
|---|---|---|---|---|---|
| 2 | 3.7892267E+00 | −9.2762597E−01 | −7.6530005E+00 | 1.8297645E+01 | −2.0254735E+01 |
| 3 | −3.5329538E+00 | 1.0818792E+01 | −1.6489485E+01 | 1.2611397E+01 | −5.1063965E+00 |
| 4 | −1.0077423E+01 | 2.0388920E+01 | −1.9447092E+01 | 4.8249008E+00 | 2.5850629E−01 |
| 5 | 1.8043876E+00 | 1.7230595E−01 | −1.9431288E+00 | 3.0002360E−01 | 3.5639158E+00 |
| 6 | −7.7922320E+00 | 9.7447399E+00 | −8.4123448E+00 | −1.6706763E−01 | 8.8199975E+00 |
| 7 | 3.8435572E+00 | −2.4959462E+00 | −2.1934023E−01 | 7.4981247E−02 | 1.1171570E+00 |
| 8 | −2.8215904E+00 | 3.0569175E+00 | −1.7787344E+00 | 5.3874517E−01 | −8.9459875E−02 |
| 9 | 4.2666483E+01 | −4.6856993E+01 | 3.1212760E+01 | −1.1686163E+01 | 4.2161302E+00 |
| 10 | 5.8263867E−02 | −9.3333213E−01 | 5.2710476E−01 | −9.8875088E−02 | 1.4904461E−01 |
| 11 | 3.0320582E+00 | −1.1463352E+00 | −6.1475513E−02 | 1.5709687E−01 | 3.6776795E−02 |

| | A12 | A13 | A14 | A15 | A16 |
|---|---|---|---|---|---|
| 2 | 2.1831020E+00 | 2.4641234E+01 | −3.1885172E+01 | 1.7189241E+01 | −3.5612264E+00 |
| 3 | 4.0862181E+00 | −4.8337202E+00 | 1.6937541E+00 | 7.0888474E−01 | −4.1573312E−01 |
| 4 | 9.4785198E+00 | −9.1744105E+00 | −2.4405795E+00 | 5.7682059E+00 | −1.8244027E+00 |
| 5 | −5.9275969E+00 | 5.7305232E+00 | −3.8426132E+00 | 1.6190093E+00 | −3.1815167E−01 |
| 6 | −4.0790315E+00 | −9.0055475E+00 | 1.2815059E+01 | −6.4408009E+00 | 1.1700653E+00 |
| 7 | 4.1574677E−01 | −1.5386205E+00 | 6.9431690E−02 | 8.1481481E−01 | −3.1162843E−01 |
| 8 | −5.3249793E−02 | 1.0536342E−01 | −3.0865939E−02 | −2.5104352E−02 | 1.1983063E−02 |
| 9 | −5.0631328E+00 | 4.7205712E+00 | −2.2864705E+00 | 5.6424565E−01 | −5.7163247E−02 |
| 10 | −1.2452487E−01 | 1.8865361E−02 | 9.7359636E−03 | −2.8327978E−03 | 9.3426110E−05 |
| 11 | −5.2044091E−02 | 1.6993435E−03 | 9.8733019E−03 | −3.5093161E−03 | 3.8686204E−04 |

TABLE 9

Values For Conditional Formulae

| Formula Number | Conditional Formulae | EXAMPLE 1 | EXAMPLE 2 | EXAMPLE 3 | EXAMPLE 4 |
|---|---|---|---|---|---|
| 1 | f/f45 | −0.298 | −0.278 | −0.297 | −0.397 |
| 2 | f · tanω/R5r | 3.199 | 3.121 | 3.107 | 3.264 |
| 3 | f3/f1 | 5.262 | 6.511 | 5.902 | 3.920 |
| 4 | (R3f − R3r)/(R3f + R3r) | −0.340 | −0.275 | −0.300 | −0.639 |
| 5 | (R2r − R3f)/(R2r + R3f) | −0.086 | −0.135 | −0.107 | −0.075 |
| 6 | f/f1 | 1.310 | 1.276 | 1.310 | 1.250 |
| 7 | f/f3 | 0.249 | 0.196 | 0.222 | 0.319 |
| 8 | f/f2 | −0.692 | −0.625 | −0.681 | −0.619 |
| 9 | D7/f | 0.105 | 0.101 | 0.099 | 0.120 |

What is claimed is:

1. An imaging lens consisting of five lenses, including:
a first lens having a biconvex shape with a surface having the radius of curvature with the smaller absolute value toward the object side;
a second lens having a negative refractive power with a concave surface toward the image side;
a third lens having a meniscus shape with a convex surface toward the object side;
a fourth lens having a negative refractive power and a meniscus shape with a convex surface toward the image side; and
a fifth lens having a negative refractive power and a meniscus shape with a concave surface toward the image side, the image-side surface thereof having at least one inflection point, disposed in this order from the object side, wherein
the imaging lens satisfies conditional formula below:

$$-0.3 < (R2r - R3f)/(R2r + R3f) < -0.05 \tag{5-1}$$

where,
R2r: the paraxial radius of curvature of the image-side surface of the second lens, and
R3f: the paraxial radius of curvature of the object-side surface of the third lens.

2. The imaging lens as defined in claim 1 that further satisfies conditional formula below:

$$-0.6 < f/f45 < -0.1 \tag{1}$$

where,
f: the focal length of the entire system, and
f45: the combined focal length of the fourth lens and the fifth lens.

3. The imaging lens as defined in claim 1 that further satisfies conditional formula below:

$$0.5 < f \tan \omega / R5r < 10 \tag{2}$$

where,
f: the focal length of the entire system,
ω: a half angle of view, and
R5r: the paraxial radius of curvature of the image-side surface of the fifth lens.

4. The imaging lens as defined in claim 1 that further satisfies conditional formula below:

$$1 < f3/f1 < 10 \tag{3}$$

where,
f3: the focal length of the third lens, and
f1: the focal length of the first lens.

5. The imaging lens as defined in claim 1 that further satisfies conditional formula below:

$$-1 < (R3f - R3r)/(R3f + R3r) < 0 \tag{4}$$

where,
R3r: the paraxial radius of curvature of the image-side surface of the third lens.

6. The imaging lens as defined in claim 1 that further satisfies the conditional formula below:

$$0.8 < f/f1 < 1.5 \tag{6}$$

where,
f: the focal length of the entire system, and
f1: the focal length of the first lens.

7. The imaging lens as defined in claim 1 that further satisfies conditional formula below:

$$0.1 < f/f3 < 0.6 \qquad (7),$$

where,
f: the focal length of the entire system, and
f3: the focal length of the third lens.

8. The imaging lens as defined in claim 1 that further satisfies conditional formula below:

$$-1 < f/f2 < -0.2 \qquad (8),$$

where,
f: the focal length of the entire system, and
f2: the focal length of the second lens.

9. The imaging lens as defined in claim 1 that further satisfies the conditional formula below:

$$0.05 < D7/f < 0.2 \qquad (9),$$

where,
f: the focal length of the entire system, and
D7: the distance between the third lens and the fourth lens along the optical axis.

10. The imaging lens as defined in claim 1 that further satisfies the conditional formula below:

$$-0.42 < f/f45 < -0.23 \qquad (1-1),$$

where,
f: the focal length of the entire system, and
f45: the combined focal length of the fourth lens and the fifth lens.

11. The imaging lens as defined in claim 1 that further satisfies conditional formula below:

$$1.5 < f \cdot \tan \omega / R5r < 4.5 \qquad (2-1),$$

where,
f: the focal length of the entire system,
ω: a half angle of view, and
R5r: the paraxial radius of curvature of the image-side surface of the fifth lens.

12. The imaging lens as defined in claim 1 that further satisfies the conditional formula below:

$$2.5 < f3/f1 < 8 \qquad (3-1),$$

where,
f3: the focal length of the third lens, and
f1: the focal length of the first lens.

13. The imaging lens as defined in claim 1 that further satisfies the conditional formula below:

$$-0.8 < (R3f - R3r)/(R3f + R3r) < -0.2 \qquad (4-1),$$

where,
R3r: the paraxial radius of curvature of the image-side surface of the third lens.

14. The imaging lens as defined in claim 1 that further satisfies the conditional formula below:

$$0.9 < f/f1 < 1.4 \qquad (6-1),$$

where,
f: the focal length of the entire system, and
f1: the focal length of the first lens.

15. The imaging lens as defined in claim 1 that further satisfies the conditional formula below:

$$0.15 < f/f3 < 0.4 \qquad (7-1),$$

where,
f: the focal length of the entire system, and
f3: the focal length of the third lens.

16. The imaging lens as defined in claim 1 that further satisfies the conditional formula below:

$$-0.8 < f/f2 < -0.5 \qquad (8-1),$$

where,
f: the focal length of the entire system, and
f2: the focal length of the second lens.

17. An imaging apparatus equipped with the imaging lens as defined in claim 1.

* * * * *